(12) United States Patent
van Zee et al.

(10) Patent No.: US 7,058,685 B1
(45) Date of Patent: Jun. 6, 2006

(54) VALIDATION AND AUDIT OF E-MEDIA DELIVERY

(75) Inventors: Pieter J. van Zee, Corvallis, OR (US); Aloke Gupta, Corvallis, OR (US); Robert M. Miller, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 702 days.

(21) Appl. No.: 09/694,542

(22) Filed: Oct. 23, 2000

(51) Int. Cl.
*G06F 15/16* (2006.01)

(52) U.S. Cl. ............. 709/206; 709/202; 709/213; 709/217; 709/218; 358/402; 358/403

(58) Field of Classification Search ............. 709/206, 709/202, 203, 213, 217, 218; 358/402, 403
See application file for complete search history.

(56) References Cited

U.S. PATENT DOCUMENTS

| 5,325,310 | A | | 6/1994 | Johnson et al. | |
|---|---|---|---|---|---|
| 5,710,816 | A | * | 1/1998 | Stork et al. | 380/257 |
| 5,790,790 | A | | 8/1998 | Smith et al. | |
| 5,832,220 | A | * | 11/1998 | Johnson et al. | 709/206 |
| 6,076,093 | A | * | 6/2000 | Pickering | 707/104.1 |
| 6,101,480 | A | * | 8/2000 | Conmy et al. | 705/9 |
| 6,314,454 | B1 | * | 11/2001 | Wang et al. | 709/206 |
| 6,327,656 | B1 | * | 12/2001 | Zabetian | 713/176 |
| 6,615,234 | B1 | * | 9/2003 | Adamske et al. | 709/203 |
| 6,618,747 | B1 | * | 9/2003 | Flynn et al. | 709/206 |
| 6,725,255 | B1 | * | 4/2004 | Hass et al. | 709/206 |
| 6,727,998 | B1 | * | 4/2004 | Tomiyasu | 709/206 |
| 6,751,670 | B1 | * | 6/2004 | Patterson | 709/206 |
| 2002/0046250 | A1 | * | 4/2002 | Nassiri | 709/206 |

FOREIGN PATENT DOCUMENTS

| EP | 0371609 | 6/1990 |
|---|---|---|
| EP | 0665486 | 8/1995 |
| EP | 0766431 | 4/1997 |
| EP | 0813161 | 12/1997 |
| JP | 411312068 A * | 11/1999 |
| WO | WO 98/33293 | 7/1998 |
| WO | WO 00/51032 | 8/2000 |

* cited by examiner

*Primary Examiner*—Jeffrey Pwu

(57) ABSTRACT

The present invention provides a method, a computer-readable medium and a digital content delivery service system for sending and validating/auditing delivery of e-media. The method includes the steps of: obtaining/receiving e-media of a sender/user wherein the sender/user has indicated a requested type of delivery of the e-media to a client/receiving party, wherein the client is a software application; accessing an account of the sender/user to obtain sender/user information; sending the e-media to the client/receiving party; and receiving a validation/audit of the requested type of delivery upon receipt/consumption of the e-media by the client/receiving party.

32 Claims, 6 Drawing Sheets

VALIDATION AND AUDIT OF E-MEDIA DELIVERY

FIELD OF THE INVENTION

The present invention relates generally to printers, and more particularly to tracking the status and delivery of e-media.

BACKGROUND OF THE INVENTION

The advent of the Internet has opened electronic communication to people allover the world. Now, instead of using "snail-mail", i.e., placing letters and pictures in envelopes with the postal service and waiting for some period of time for the letters and pictures to be delivered, electronic data files, including digital pictures and the like, may be sent electronically to a desired recipient. However, the sender is generally unable to determine whether the recipient has received and consumed the electronic media that has been transferred to him/her, i.e., whether the e-media has been interacted with by the receiving party in a particular manner. On-line e-media audit and verification are not available.

Thus, there is a need for a method, computer-readable medium and system for providing e-media audit and verification in a digital content delivery service system.

SUMMARY OF THE INVENTION

In a digital content delivery service system, the present invention provides a method of sending and validating/auditing delivery of e-media. The method includes the steps of: obtaining or receiving e-media of a sender or user wherein the sender or user has indicated a requested type of delivery of the e-media to a client or receiving party; accessing an account of the sender or user to obtain sender or user information; sending the e-media to the client or receiving party; and receiving a validation or audit of the requested type of delivery upon receipt or consumption of the e-media by the client or receiving party. A client here is a software program that is installed on a PC or other device. The client then interacts with the server side part of the solution to retrieve the eMedia and to, potentially, provide the validation level required. Where the validation or audit of the requested type of delivery is attended by the client or receiving party (attended means the end user is physically present and usually engaged in requesting the delivery of the eMedia), the validation or audit may include means to verify presence such as a biometric signature sent by the client/receiving party and/or a user's encrypted/unencrypted Unique IDentifier entered by the client/consumer receiving party to indicate that the e-media has been received/consumed. Alternatively, the validation/audit of the requested type of delivery may be unattended by the client/receiving party. The e-media may be received/consumed by printing, by viewing, or the like. Validation/audit of delivery may be separated in time from a time when the content was delivered to the device. The system may wait until the next time the end user interacts with it before it sends the validation.

The present invention provides a computer-readable medium having computer-executable instructions for sending and validating/auditing delivery of e-media by a digital content delivery service system. The computer-executable instructions typically include the steps of: obtaining/receiving e-media of a sender/user wherein the sender/user has indicated a requested type of delivery of the e-media to a client/receiving party; accessing an account of the sender/user to obtain sender/user information; sending the e-media to the client/receiving party; and receiving a validation/audit of the requested type of delivery upon receipt/consumption of the e-media by the client/receiving party. Where the validation/audit of the requested type of delivery is attended by the client/receiving party, the validation/audit may include, for example, a biometric signature sent by the client/receiving party and/or a user's encrypted/unencrypted Unique IDentifier entered by the client/consumer/receiving party to indicate that the e-media has been received/consumed. Where selected, the validation/audit of the requested type of delivery may be unattended by the client/receiving party. The e-media may be received/consumed by printing, viewing, or the like.

The present invention also provides a digital content delivery service system for sending and validating/auditing delivery of e-media. The system typically includes an interface e-media transfer unit, a validation/audit processing unit, and a sender/user account storage unit. The interface e-media transfer unit is arranged to communicate with a plurality of senders/users and is coupled to a sender/user account storage unit. The interface e-media transfer unit is programmed to obtain/receive e-media of a sender/user wherein the sender/user has indicated a requested type of delivery of the e-media to a client/receiving party and to store sender/user information and requested type of delivery in the sender/user account storage unit. The validation/audit-processing unit is coupled to the interface e-media transfer unit and to the sender/user account storage unit. The validation/audit processing unit obtains sender/user information and the requested type of delivery from the sender/user account storage unit, sends the e-media to the client/receiving party, may audit requests to send/receive the e-media, and obtains validation/audit information for receipt/consumption of the e-media. The sender/user account storage unit is coupled to the interface e-media transfer unit and to the validation/audit processing unit. The sender/user account storage unit is utilized for storing sender/user information and a requested type of delivery of e-media. Where at least part of the validation/audit information of the requested type of delivery may be provided by the client/receiving party, the validation/audit information may include a biometric signature sent by the client/receiving party and/or a user's encrypted/unencrypted Unique IDentifier entered by the client/consumer/receiving party to indicate receipt/consumption of the e-media. Where selected, the validation/audit information of the requested type of delivery may be automatically provided by a device or devices of the client/receiving party such as, for example, a printing device or a viewing device or software acting as a proxy or device driver for them. The receipt or consumption of the e-media may be achieved by printing, viewing, or the like.

In another embodiment, the present invention may be implemented by a method, in a digital content delivery system, for performing an attended validation/audit of delivery of e-media, that includes the steps of: packaging, by the sender/user, the e-media and specifying a level of feedback; requesting, by the sender/user, a delivery service to deliver the e-media; accessing, by the delivery service, the sender/user account to obtain pertinent information; transmitting, by the delivery service, the e-media to the client/receiving party; delivering of the e-media to a personal computer/device of the client/receiving party; and validating, by the client/receiving party, that the e-media has been received. The step of delivering the e-media to a personal computer/device of the client/receiving party may include informing the delivery service that the e-media was delivered and/or determining a desired level of delivery validation.

The step of delivering the e-media to a personal computer/device of the client/receiving party may include informing the delivery service that the e-media was delivered and/or verifying utilization by the receiving party. The step of validating, by the client/receiving party, that the e-media has been received may include sending, by the client/receiving party, a biometric signature and/or entering a user's encrypted/unencrypted Unique IDentifier by the client/consumer/receiving party to indicate that the e-media has been utilized.

In another embodiment, the present invention may be implemented by a method, in a digital content delivery system, for performing an unattended validation/audit of delivery of printed e-media, where the steps include: packaging, by the sender, the e-media and specifying the level of feedback; receiving, by the delivery service, the e-media delivery request; accessing, by the delivery service, the sender/user account to obtain pertinent information; transmitting, by the delivery service, the e-media to the client/receiving party; delivering of the e-media to a printer of the client/receiving party; and validating, by a printer of the client/receiving party, that the e-media has been received/consumed. The step of transmitting, by the delivery service, the e-media to the client/receiving party may include informing the delivery service that the e-media was transmitted and/or determining a desired level of delivery validation/audit. The step of delivering the e-media to a personal printer of the client/receiving party may include informing the delivery service that the e-media was delivered and/or verifying receipt/consumption by the client/receiving party. The step of validating, by the printer of the client/receiving party, that the e-media has been received/consumed may include automatically sending, by the printer of the client/receiving party, a biometric signature and/or automatically entering a user's encrypted/unencrypted Unique IDentifier by the printer of the client/consumer/receiving party to indicate that the e-media has been received/consumed.

In another embodiment, the present invention may be implemented as a method, in a digital content delivery system, for performing an unattended validation/audit of delivery of e-media, where the steps include: packaging, by the sender/user, the e-media and specifying, by one of: the sender/user and a client/receiving party, the level of feedback; requesting, by the sender/user, the delivery service to deliver the e-media; accessing, by the delivery service, the sender/user account to obtain pertinent information; transmitting, by the delivery service, the e-media to the client/receiving party; delivering of the e-media to a consumption device of the client/receiving party; and validating, by the consumption device of the client/receiving party, correct delivery of the e-media. The pertinent information may include at least one of: a user's encrypted/unencrypted Unique IDentifier; identification of the e-media; and a desired level of delivery validation/audit feedback. The step of validating, by the consumption device of the client/receiving party, the correct delivery of the e-media may include validating a user's encrypted/unencrypted Unique Identifier.

DETAILED DESCRIPTION OF THE PREFERRED EMBODIMENTS

Figure 1:
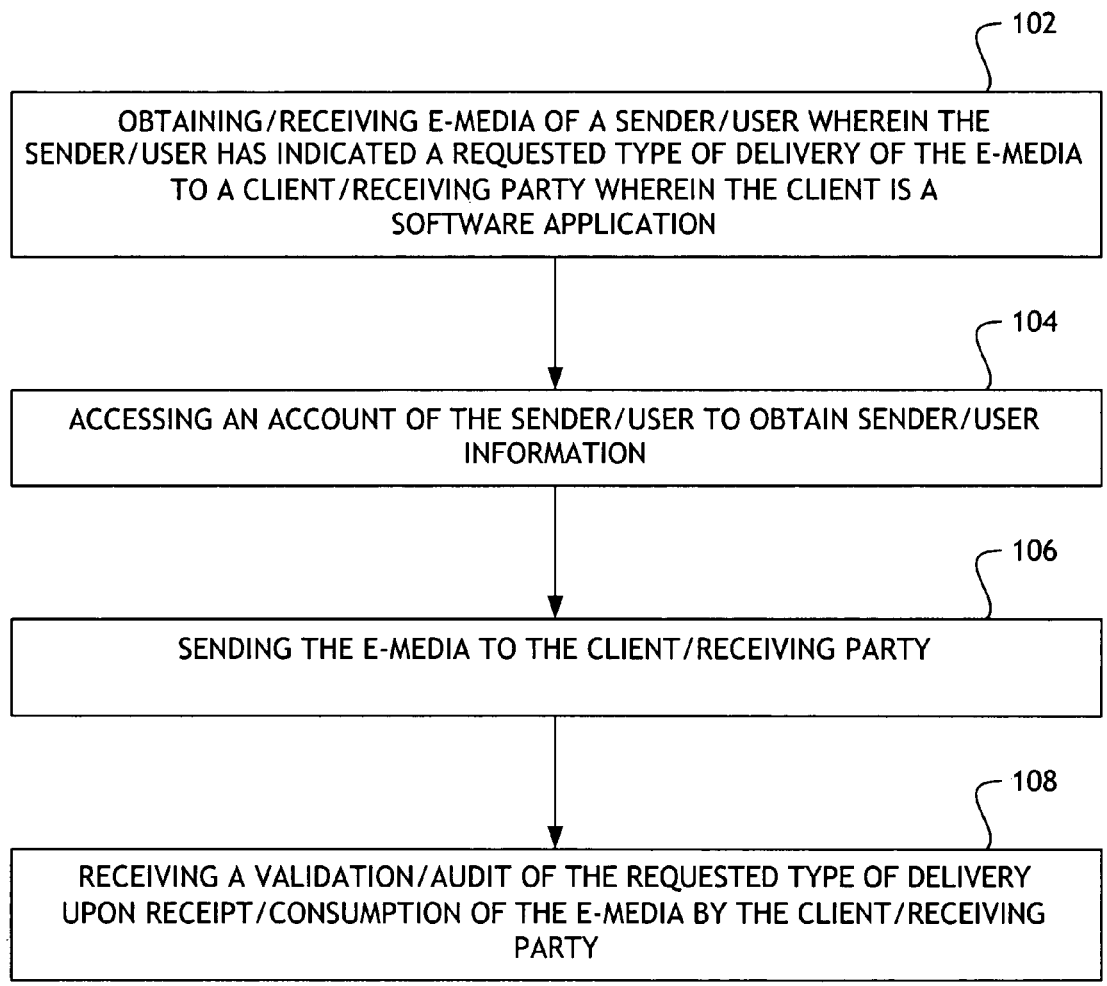
FIG. 1 is a flow chart showing one embodiment of steps of a method of sending and validating/auditing delivery of e-media in accordance with the present invention.

The present invention provides a method, a computer-readable medium and a digital content delivery system for validating or auditing delivery of electronic media, i.e., e-media. The sender or user may specify a requested type of delivery for the e-media. Then, the digital content delivery system either obtains the e-media from the sender/user or receives the e-media from the sender/user. After checking the sender/user's account for pertinent information, the digital content delivery system sends the e-media to the client or receiving party, tracks the client's or receiving party's receipt/consumption of the e-media, and provides a validation or audit of the receipt/consumption. Such a system provides specific information to the sender/user with respect to the client's/receiving party's interaction with the e-media, providing a valuable service, for example, for publishers who want to know what articles or advertisements the client/receiving party reviewed. Typically, the specific information may include, for example, the time that the client/receiving party interacted with the e-media, which portions of the e-media were reviewed by the client/receiving party, whether the e-media was printed, whether the printing operation was successful, how many copies were printed, and the like. Where desired, the e-media may be unforwardable, e.g., packaged to be transmittable only to a particular computer, in order to limit the distribution to clients/receiving parties who have arranged to pay to receive the information. Packaging is the process wherein the server side software combines the eMedia being delivered along with other instructions, encodings, etc. and incorporates them into a single logical object—similar to the way an email message with attachments comes across as a single object. This allows the server side system as well as any client software to deal with the entire object as a single entity.

The sender/publisher may specify whether it is necessary for a specific individual, a designated individual, or any individual to be present to receive the electronic material being sent. A query of the e-media's location and status is available to the sender/publisher at any time. The sender typically also specifies the level of feedback desired for the specific e-media being sent. Some choices may include determining if the document/material was printed, how long did it take for the electronic material to reach the client's system, or did the end user interact with the content of the e-media for a period of time before responding that it was received. For example, with respect to email, a sender may decide on its own to originate content and send it to the receiving party, requesting validation and/or audit. Also, with respect to the Internet, a receiving party may request validation and/or audit when it requests content from a sender.

Clearly, validation and audit are different. Validation indicates that delivery was obtained. For example, validation may be implemented by using sensors that indicate ink hitting paper, paper landing in the output tray, and the like. Audit indicates a record of the chain of delivery events along the way, e.g., a request to obtain content, content arrived, printing of content initiated, printing of content completed, and the like. Receiving parties as well as senders may request validation and/or audit since receiving parties may desire an audit trail for their own purposes, such as remuneration, studies, and the like.

Where the receiving party attends validation of e-media delivery, the sender/publisher may specify numerous options about which individual may receive the e-media. This may include requiring that a unique encrypted identification code be entered in order to receive the e-media, that a biometric signature be entered to obtain the e-media, or that material of a less sensitive nature may be claimed by any individual with an account on the designated device. A complex or simple response of receipt may also be required. As with the unattended version, levels of feedback about the e-media's tractability may also be established by the sender/publisher. The tracing information may be "packaged" with the e-media and sent to the digital content delivery service. The delivery service gathers the pertinent components to fulfill the sender's request. Where desired, the e-media may be sent by the sender/user to the digital content delivery service. Alternatively, as is known in the art, the digital content delivery service may be arranged to "pull" the e-media from the sender/user. The e-media may then be transmitted to the client/receiving party. If there has been an authentication of recipient request from the sender, a biometric signature from the recipient may be necessary to receive the e-media. Whatever criterion was established by the sender for the recipient must be observed in order to obtain the e-media. There are many ways that may be used to specify what is to be tracked. In one embodiment, a device may select always reporting an event and a server may decide whether to record the event or not.

Once the e-media has been received by the intended addressee, a confirmation of acceptance is initiated by the recipient. The confirmation may be performed in numerous ways. Some examples include, but are not limited to, scanning of an embedded code on the e-media, entering a unique key code found on the e-media, or playing, showing or executing the e-media itself. This confirmation information is received by the client from the user/appliance interface and transmitted back to the digital content delivery service. The delivery service then notifies the sender that their transaction is complete.

In a digital content delivery service system, the present invention provides a method of sending and validating/auditing delivery of e-media. As shown in FIG. 1, the method 100 includes the steps of: obtaining/receiving 102 e-media of a sender/user wherein the sender/user has indicated a requested type of delivery of the e-media to a client/receiving party; accessing 104 an account of the sender/user to obtain sender/user information; sending 106 the e-media to the client/receiving party; and receiving 108 a validation/audit of the requested type of delivery upon receipt/consumption of the e-media by the client/receiving party. Clearly, the e-media may be "pulled" from the sender/user, or alternatively, may be sent to the delivery system by the sender/user. E-media may be transmitted using wireless devices, or alternatively, may be sent using land lines such as, for example, telephone lines, cable connections and the like.

Where validation/audit of the requested type of delivery is attended by the client/receiving party, i.e., the client/receiving party provides at least part of information for the validation/audit, the validation/audit may include a biometric signature sent by the client/receiving party and/or a user's encrypted/unencrypted Unique IDentifier entered by the client/consumer/receiving party to indicate that the e-media has been received/consumed. In another embodiment, the validation/audit of the requested type of delivery may be unattended by the client/receiving party. The e-media is received/consumed by printing or may be received/consumed other than by printing, e.g., by viewing.

Figure 2:
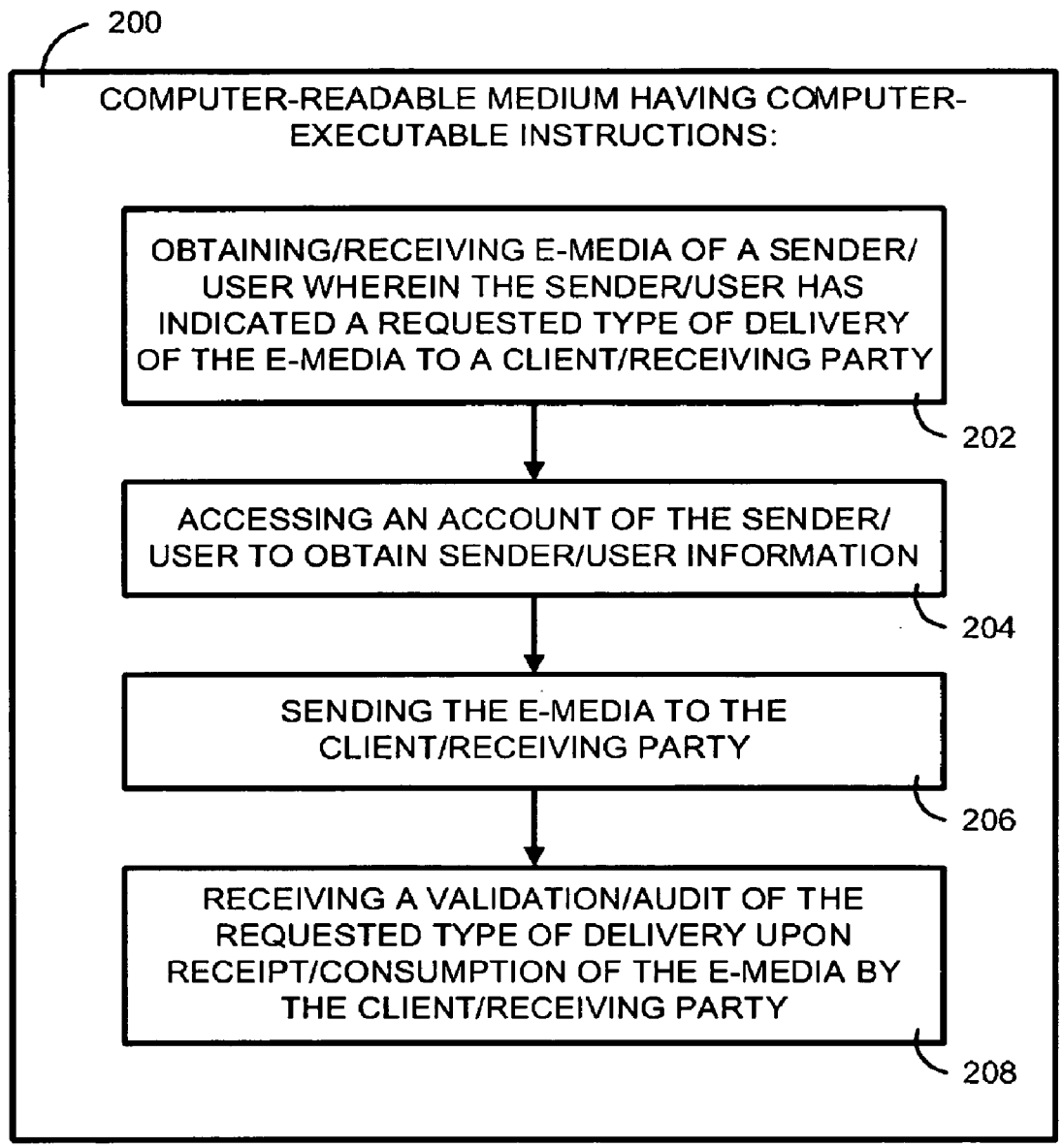
FIG. 2 is a block diagram of one embodiment of a computer-readable medium having computer-executable instructions for sending and validating/auditing delivery of e-media by a digital content delivery service system in accordance with the present invention.

FIG. 2 is a block diagram of one embodiment of a computer-readable medium 200 having computer-executable instructions for sending and validating/auditing delivery of e-media by a digital content delivery service system in accordance with the present invention. In one embodiment, the computer-executable instructions include the steps of: obtaining/receiving 202 e-media of a sender/user wherein the sender/user has indicated a requested type of delivery of the e-media to a client/receiving party; accessing 204 an account of the sender/user to obtain sender/user information; sending 206 the e-media to the client/receiving party; and receiving 208 a validation/audit of the requested type of delivery upon receipt/consumption of the e-media by the client/receiving party. Where the validation/audit of the requested type of delivery is attended by the client/receiving party, the validation/audit may include a biometric signature sent by the client/receiving party and/or a user's encrypted ID Unique IDentifier entered by the client/consumer/receiving party to indicate that the e-media has been received/consumed. Alternatively, the validation/audit of the requested type of delivery may be unattended by the client/receiving party, and validation/audit is carried out automatically by the digital content delivery service system. The e-media may received/consumed by printing, viewing, audio presentation or the like.

Figure 3:
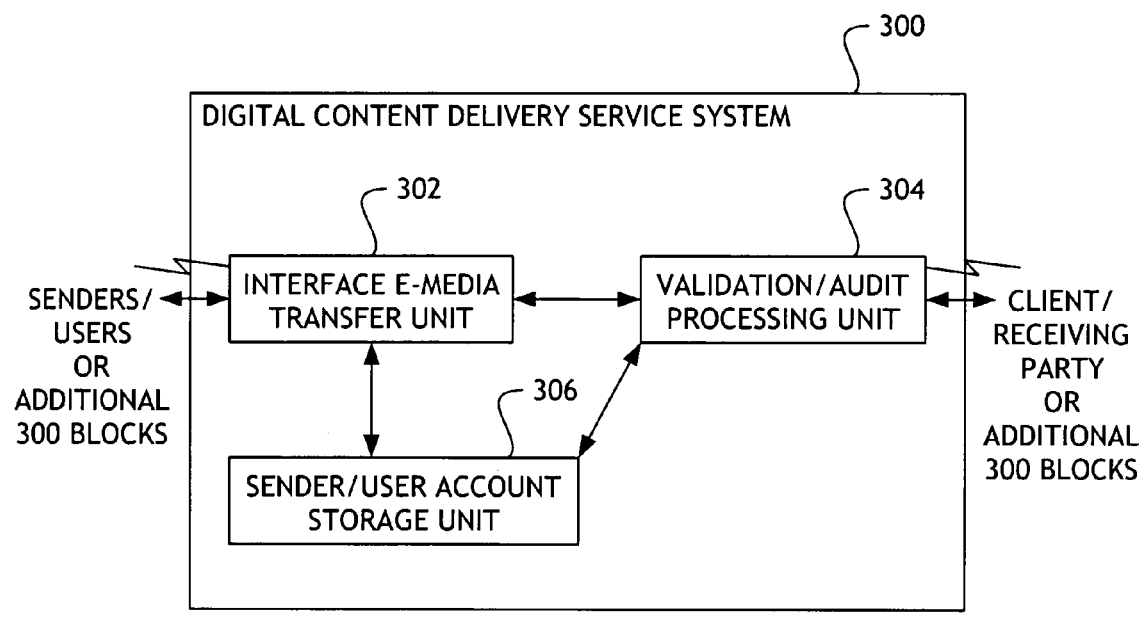
FIG. 3 is a block diagram of one embodiment of a digital content delivery service system for sending and validating/auditing delivery of e-media in accordance with the present invention.

FIG. 3 is a block diagram of one embodiment of a digital content delivery service system 300 for sending and validating/auditing delivery of e-media in accordance with the present invention. The digital content delivery service system 300 includes an interface e-media transfer unit 302, a validation/audit processing unit 304, and a sender/user account storage unit 306. The interface e-media transfer unit 302 is arranged to communicate with at least one of: a plurality of senders/users and other digital content delivery service system/systems and is coupled to a sender/user account storage unit 306 and a validation/audit processing unit 304. The interface e-media transfer unit 302 is programmed to obtain/receive e-media of a sender/user wherein the sender/user has indicated a requested type of delivery of the e-media to a client/receiving party and to store sender/user information and requested type of delivery in the sender/user account storage unit. The validation/audit processing unit 306 is coupled to the interface e-media transfer unit 302 and to the sender/user account storage unit 304. The validation/audit processing unit 306 obtains sender/user information and the requested type of delivery from the sender/user account storage unit 304, sends or transmits the e-media to the client/receiving party, and obtains validation/audit information for receipt/consumption of the e-media. Consumption means interaction of the client/receiving party with the e-media. The sender/user account storage unit 304 is coupled to the interface e-media transfer unit 302 and to the validation/audit processing unit 306. The sender/user account storage unit 304 stores sender/user information and the requested type of delivery of e-media by the sender/user.

If at least part of the validation/audit information of the requested type of delivery is provided by the client/receiving party, the validation/audit information may include, for example, a biometric signature sent by the client/receiving party and/or a user's encrypted Unique IDentifier entered by the client/consumer/receiving party to indicate receipt/consumption of the e-media. Alternatively, the validation/audit information of the requested type of delivery may be automatically provided by a device/devices of the client/receiving party. For example, a printer of the client/receiving party may receive the e-media, print out the e-media, determine that the entire e-media was printed and send the validation information to the delivery system. The receipt/consumption of the e-media may be achieved by printing, viewing electronically, outputting audio or the like.

The digital content delivery system unit represented by 300 may be chained together such that there maybe many storage points, many interfaces/transfer units, and many validation/audit units participating between the sender and the receiving party.

Figure 4:
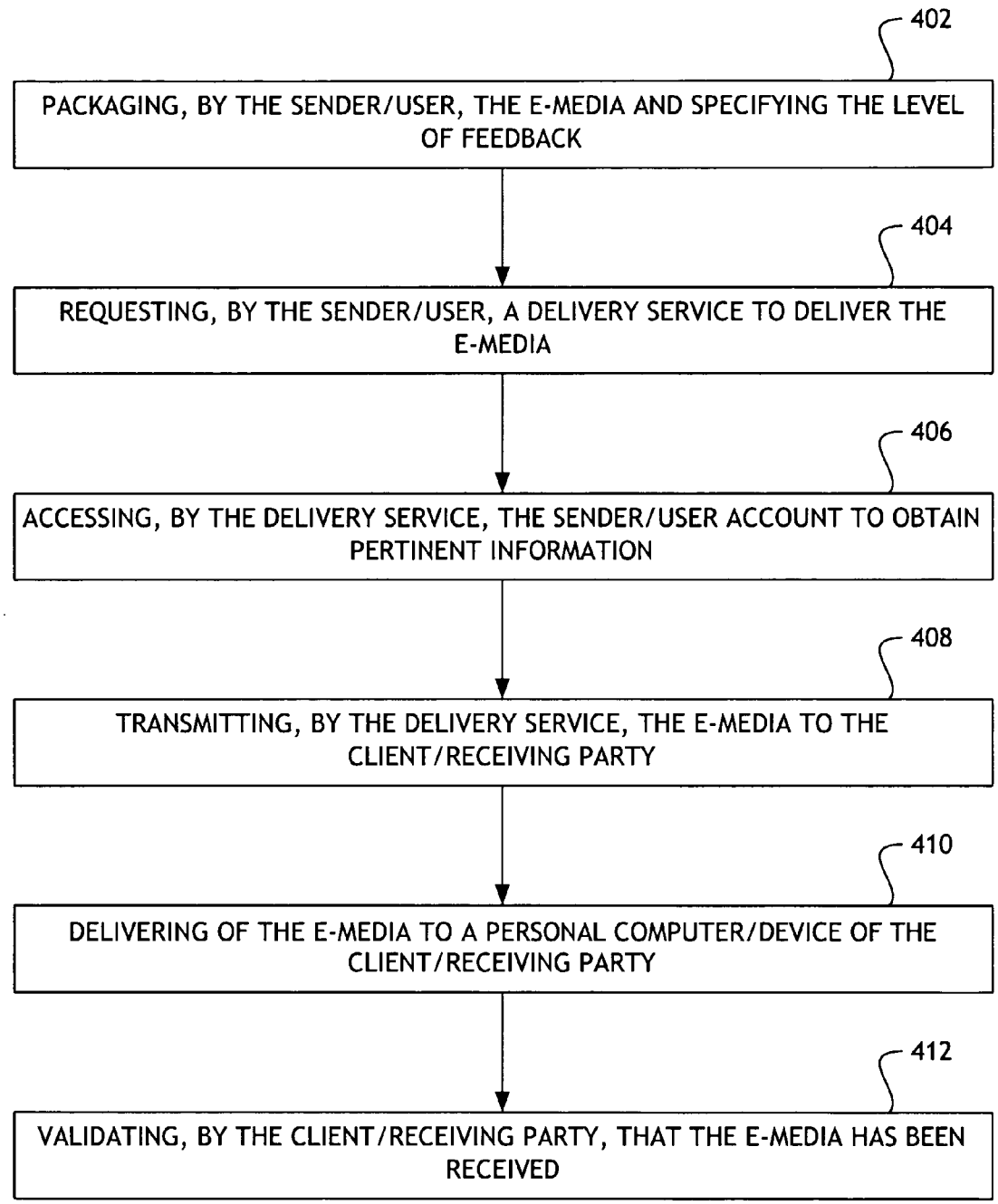
FIG. 4 shows a flow diagram of one embodiment of a method for providing attended validation of e-media in a digital content delivery system in accordance with the present invention.

An example of one embodiment of a method 400 for providing attended validation of e-media in accordance with the present invention is illustrated in FIG. 4: (1) packaging 402, by the sender, the e-media and specifying the level of feedback; (2) requesting 404, by the sender/user, the delivery service to deliver the e-media; (3) accessing 406, by the delivery service, the sender/user account to obtain pertinent information; (4) transmitting 408, by the delivery service, the e-media to the client/receiving party; (5) delivering 410 of the e-media to a personal computer/device of the client/receiving party; and (6) validating 412, by the client/receiving party, that the e-media has been received.

The step of packaging 402 typically indicates that the level of feedback may be one of: receiving an indication that e-media is printed, receiving a response to an audit path query with respect to progress, or receiving a report when the e-media is utilized. The step of accessing 406 the sender/user account for pertinent information may include validating an encrypted user key and a Unique IDentifier (UID), identifying the e-media to be sent, providing designated feedback, and/or informing the sender/user upon e-media utilization.

A UID is often a unique number used to identify an object. In one embodiment, the UID is computed by adding the time and date to the network adapter's internal serial number. Standard applications, such as word processors and spreadsheets, may be written to expose their internal functions as objects, allowing them to be "automated" instead of manually selected from a menu. For example, a script may be written to extract data from a database, summarize and chart it in a spreadsheet and place the results into a text document. In addition, applications may invoke objects called controls that blend in and become just another part of the program. Third-party, ready-made controls have been created that may be downloaded from the Internet, for example, to make a Web page perform desired processing. Often, the UID is not entered by a user directly since it would usually be impractical to do so. However, many UIDs can be provided by or entered by a user, such as an email address.

The step of delivering 410 of the e-media to a personal computer/device of the client/receiving party may include informing the delivery service that the e-media was delivered, determining a desired level of delivery validation, and/or verifying utilization by the receiving party. The step of validating 412, by the client/receiving party, that the e-media has been received may include sending, by the client/receiving party, a biometric signature or entering a user's encrypted UID by the client/consumer/receiving party to indicate that the e-media has been utilized/consumed.

Where the e-media is published by being transmitted to a device for printing without intervention/direct receipt by the receiving party, and validation is desired by the sender, the sender specifies the desired feedback, which may be "packaged" and sent to the Digital content delivery service along with the actual documents. The delivery service receives the package, ascertains which feedback mechanisms are requested and implements the tracking/audit process necessary to achieve this feedback. The documents are then transmitted to the digital content delivery service system client's PC or other device. The client's device then verifies that the document was printed correctly, with either an attached scanning appliance, using a checksum verification, or some other mechanism. If the delivery confirmation was requested, a feedback message is transmitted from the printer or device, along with other information that was specified to the digital content delivery service system client's PC or other device. The desired feedback is then sent to the e-Media publishing services. Here the feedback may be available for the sender to retrieve upon a query, or the sender may have specified that he/she wants to the informed when the documents are delivered and printed. In the later case, the delivery service transmits the delivery information to the original sender/publisher.

Figure 5:
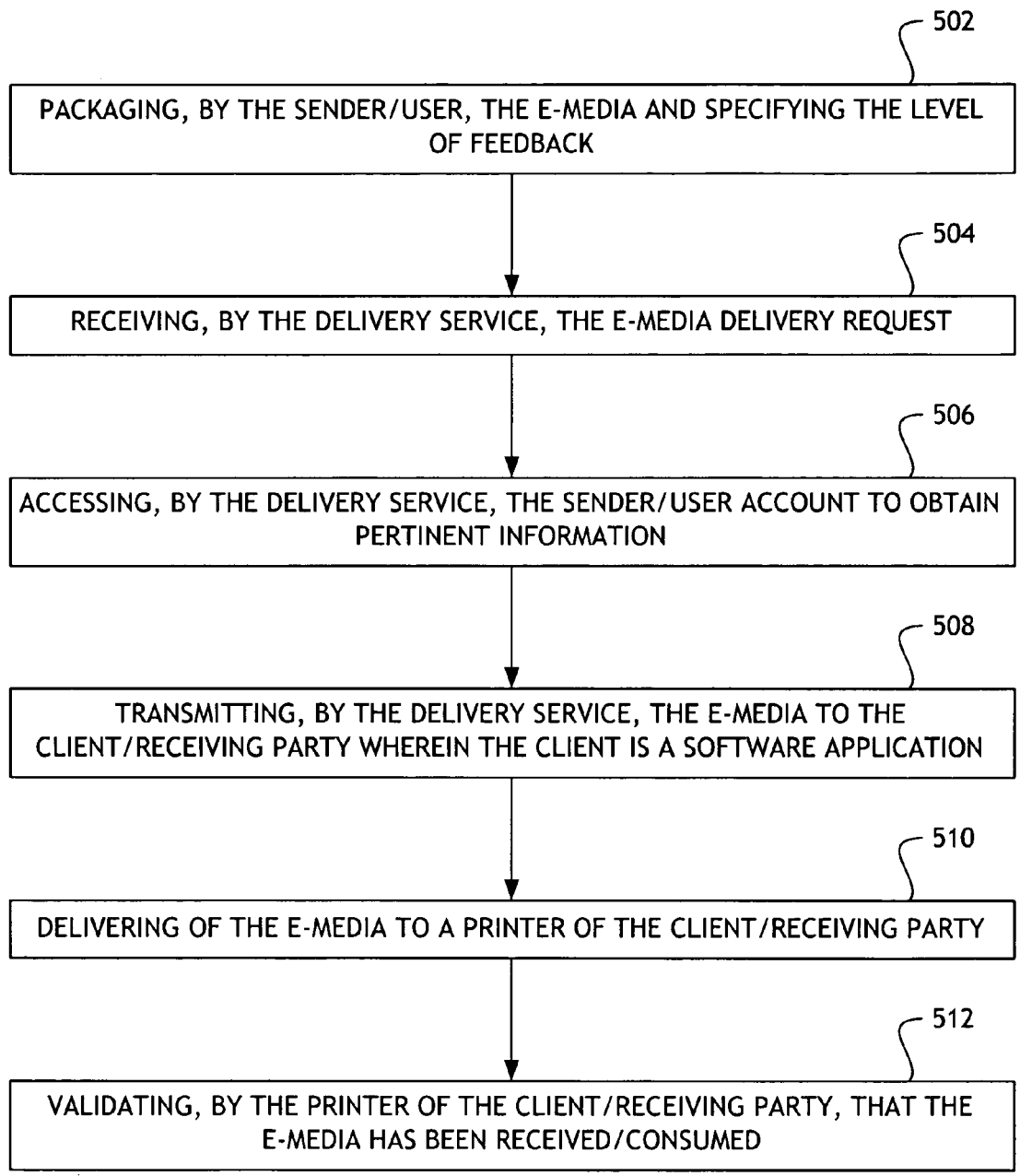
FIG. 5 shows a flow diagram of one embodiment of a method for providing unattended validation of printed e-media in a digital content delivery system in accordance with the present invention.

An example of one embodiment of a method 500 for providing unattended validation of printed e-media in accordance with the present invention is illustrated in FIG. 5. The method includes the steps of: packaging 502, by the sender, the e-media and specifying the level of feedback; receiving 504, by the delivery service, the e-media delivery request; accessing 506, by the delivery service, the sender/user account to obtain pertinent information; sending/transmitting 508, by the delivery service, the e-media to the client/receiving party; delivering 510 of the e-media to a printer of the client/receiving party; and validating 512, by the printer of the client/receiving party, that the e-media has been received/consumed. The step of sending/transmitting 508, by the delivery service, the e-media to the client/receiving party may include informing the delivery service that the e-media was transmitted and/or determining a desired level of delivery validation/audit. The step of delivering 510 the e-media to the printer of the client/receiving party may include informing the delivery service that the e-media was delivered and/or verifying receipt/consumption by the client/receiving party.

The step of validating 512, by the printer of the client/receiving party, that the e-media has been received/consumed may include, for example, one of: automatically sending, by the printer of the client/receiving party, a biometric signature; and automatically entering a user's encrypted Unique IDentifier by the printer of the client/consumer/receiving party to indicate that the e-media has been received/consumed.

When the e-media is received, but the receiving party is not in attendance, the sender may specify the desired feedback. The e-media is then "packaged and sent to the digital content delivery service. The delivery service determines what audit process and delivery validation have been established by the sender and transmits the e-media to the recipient. Using techniques such as checksums, a private key encryption or the like, verification of delivery may be confirmed. The checksum values are validated, and the appliance receiving the e-media then sends back a unique token, such as an encrypted key, to the digital content delivery service confirming that the delivery was complete. Depending on the feedback requested by the sender/publisher, the digital content delivery service then reports back to the sender.

Figure 6:
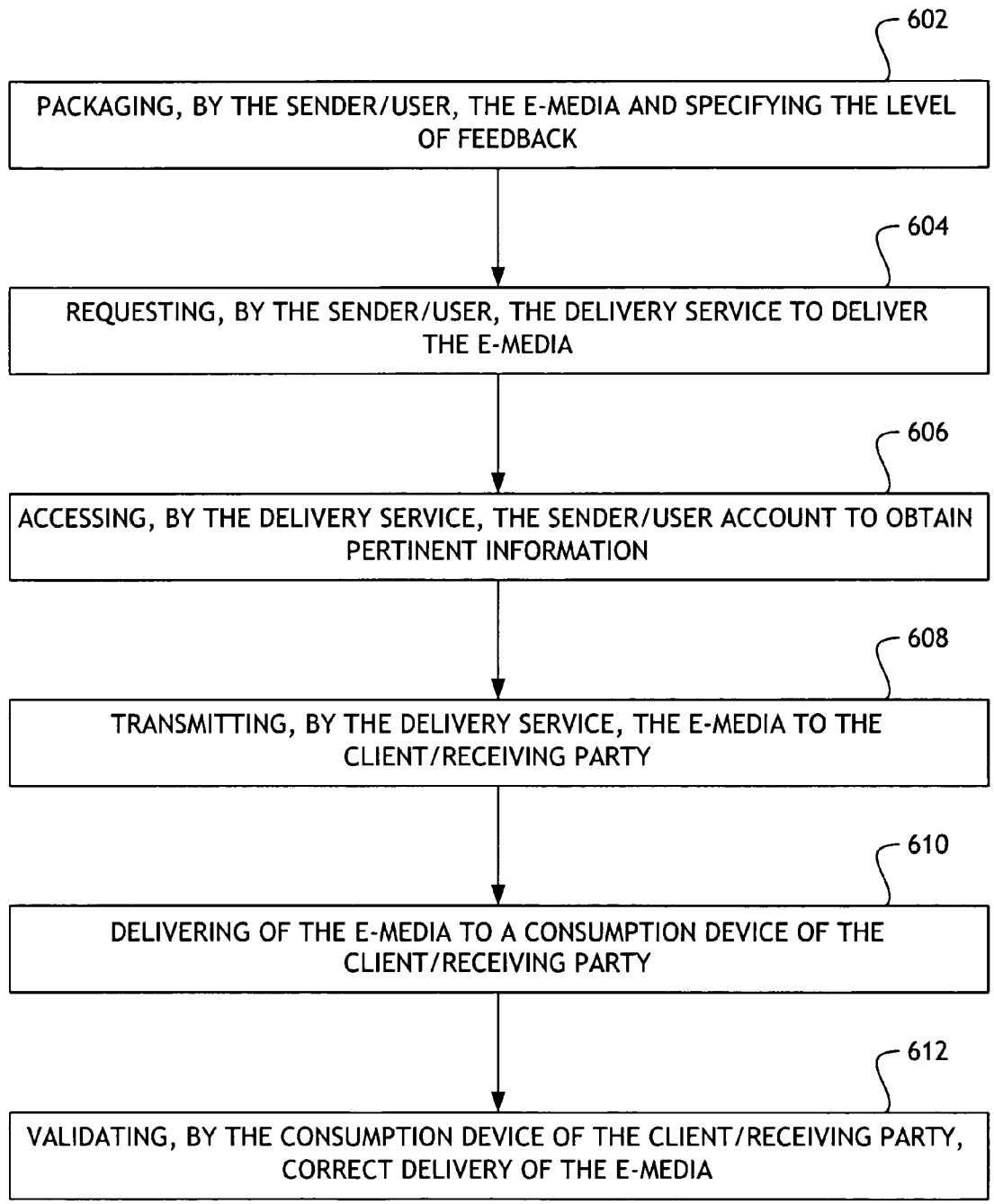
FIG. 6 shows a flow diagram for one embodiment of a method for performing an unattended validation/audit of delivery of e-media in a digital content delivery system in accordance with the present invention.

FIG. 6 shows one embodiment of a method 600 for performing an unattended validation/audit of delivery of e-media in a digital content delivery system in accordance with the present invention. The method includes: packaging 602, by the sender/user, the e-media and specifying by one of: the sender/user and a client/receiving party, the level of feedback; requesting 604, by the sender/user, the delivery service to deliver the e-media; accessing 606, by the delivery service, the sender/user account to obtain pertinent information; transmitting 608, by the delivery service, the e-media to the client/receiving party; delivering 610 of the e-media to a consumption device of the client/receiving party; and validating 612, by the consumption device of the client/receiving party, correct delivery of the e-media. The pertinent information may include, for example, a user's encrypted Unique Identifier, identification of the e-media, and/or a desired level of delivery validation/audit feedback. The step of validating 612, by the consumption device of the client/receiving party, the correct delivery of the e-media may include validating a user's encrypted Unique Identifier. The consumption device may be a viewing device such as a television monitor, a personal computer viewing screen, may be a printing device, an audio device or the like.

Other types of validation may, for example, be:
sender wants to known that the material was viewed/printed;
sender wants acknowledgement from user of receipt;
sender wants to know when user received and then interacted with the eMedia;
sender wants regular updates on status of material (e.g., the HP e-Media publishing service has the content and is waiting for the intended recipient's device to connect with the service so that it can be delivered;
receiving party wants an audit trail of the deliveries made to a system;
receiving party wants validation of delivery to a device, e.g., a printer, to be tallied to that device's consumables use or to use of the device by a particular user's account.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. In a digital content delivery service system, a method of sending and validating delivery of e-media, comprising the steps of:
receiving e-media of a sender wherein the sender has indicated a requested type of delivery of the e-media to a receiving party, wherein the client is a software application;
specifying, by the sender, a level of feedback from the receiving party that includes determining if the e-media and attached documents sent with it were printed and if the receiving party opened and interacted with the e-media and attached documents;
accessing an account of the sender to obtain sender information;
sending the e-media to the receiving party;
creating a history record that includes a chain of delivery events occurring after sending the e-media and interaction events occurring after receipt of the e-media;
receiving, by the sender, the history record and a validation of the requested type of delivery upon receipt of the e-media in the form of a biometric signature to indicate receipt of the e-media by the receiving party to allow the sender to make future e-media delivery decisions, wherein the validation of the requested type of delivery is unattended by the receiving party; and
sending to the sender the history record and regular status updates on availability times of the receiving party to receive new e-media based on the events of the history record.

2. The method of claim 1 wherein the validation of the requested type of delivery is attended by the receiving party.

3. The method of claim 2 wherein the validation includes at least one of:
a biometric signature sent by the receiving party; and
a user's Unique IDentifier entered by the receiving party to indicate that the e-media has been received.

4. The method of claim 1 wherein if there has been an authentication of recipient request from the sender, an Unique IDentifier entered by the receiving party and a biometric signature from the recipient is required to receive the e-media to indicate that the e-media has been received.

5. The method of claim 1 wherein the e-media is received by printing.

6. The method of claim 1 wherein the e-media is received other than by printing.

7. A computer-readable medium having computer-executable instructions for sending and validating delivery of e-media by a digital content delivery service system, the computer-executable instructions including the steps of:
receiving e-media of a sender wherein the sender has indicated a requested type of delivery of the e-media to a receiving party, wherein the client is a software application;
specifying, by the sender, a level of feedback from the receiving party that includes determining if the e-media and attached documents sent with it were printed and if the receiving party opened and interacted with the e-media and attached documents;
accessing an account of the sender to obtain sender information;
sending the e-media to the receiving party;
creating a history record that includes a chain of delivery events occurring after sending the e-media and interaction events occurring after receipt of the e-media;
receiving, by the sender, the history record and a validation of the requested type of delivery upon receipt of the e-media in the form of a biometric signature to indicate receipt of the e-media by the receiving party, wherein the validation of the requested type of delivery is unattended by the receiving party; and
sending to the sender the history record and regular status updates on availability times of the receiving party to receive new e-media based on the events of the history record.

8. The computer-readable medium of claim 7 wherein the validation of the requested type of delivery is attended by the receiving party.

9. The computer-readable medium of claim 8 wherein the validation includes at least one of:
   a biometric signature sent by the receiving party; and
   a user's Unique IDentifier entered by the receiving party to indicate that the e-media has been received.

10. The computer-readable medium of claim 7 wherein if there has been an authentication of recipient request from the sender, an Unique IDentifier entered by the receiving party and a biometric signature from the recipient is required to receive the e-media to indicate that the e-media has been received.

11. The computer-readable medium of claim 7 wherein the e-media is received by printing.

12. The computer-readable medium of claim 7 wherein the e-media is received other than by printing.

13. A digital content delivery service system for sending and auditing delivery of e-media, comprising:
   an interface e-media transfer unit, arranged to communicate with at least one of:
      a plurality of senders and other digital content delivery service systems and coupled to a sender account storage unit and a audit processing unit, programmed to receive e-media of a sender wherein the sender has indicated a requested type of delivery of the e-media to a receiving party and to store sender information and requested type of delivery in the sender account storage unit, wherein the sender specifies a level of feedback from the receiving party that includes determining if the e-media and attached documents sent with it were printed and if the receiving party opened and interacted with the e-media and attached documents;
   the audit processing unit, coupled to the interface e-media transfer unit and to the sender account storage unit, for obtaining sender information and the requested type of delivery from the sender account storage unit in the form of a biometric signature to indicate receipt of the e-media, sending the e-media to the receiving party digital content delivery service systems, creating a history record that includes a chain of delivery events occurring after sending the e-media and interaction events occurring after receipt of the e-media, and obtaining the history record and audit information for receipt of the e-media, wherein the audit of the requested type of delivery is unattended by the receiving party;
   the sender account storage unit, coupled to the interface e-media transfer unit and the audit processing unit, for storing sender information and a requested type of delivery of e-media; and
   the sender receives the history record and regular status updates on availability times of the receiving party to receive new e-media based on the events of the history record.

14. The digital content delivery service system of claim 13 wherein at least part of the information of the requested type of delivery is provided by the receiving party.

15. The digital content delivery service system of claim 14 wherein the audit information includes at least one of:
   a biometric signature sent by the receiving party; and
   a user's Unique IDentifier entered by the receiving party to indicate receipt of the e-media.

16. The digital content delivery service system of claim 13 wherein the audit information of the requested type of delivery is automatically provided by a device/devices of the receiving party.

17. The digital content delivery service system of claim 13 wherein the receipt of the e-media is achieved by printing.

18. The digital content delivery service system of claim 13 wherein the receipt of the e-media is achieved other than by printing.

19. In a digital content delivery service system, a method for performing audit of delivery of e-media, comprising the steps of:
   packaging, by the sender, the e-media;
   specifying, by the sender, a level of feedback from the receiving party that includes determining if the e-media and attached documents sent with it were printed and if the receiving party opened and interacted with the e-media and attached documents;
   requesting, by the sender, a delivery service to deliver the e-media;
   accessing, by the delivery service, the sender account to obtain pertinent information;
   transmitting, by the delivery service, the e-media to the receiving party;
   delivering of the e-media to a personal computer/device of the receiving party;
   creating a history record that includes a chain of delivery events occurring after sending the e-media and interaction events occurring after receipt of the e-media; and
   validating, in the form of a biometric signature, by the receiving party, that the e-media has been received and sending the history record and regulator status updates on availability times of the receiving party to receive new e-media based on the events of the history record to the sender and the receiving party, wherein the audit of the requested type of delivery is unattended by the receiving party.

20. The method of claim 19 wherein the step of delivering the e-media to a personal computer/device of the receiving party includes at least one of:
   informing the delivery service that the e-media was delivered; and
   determining a desired level of delivery validation.

21. The method of claim 19 wherein the step of delivering the e-media to a personal computer/device of the receiving party includes at least one of:
   informing the delivery service that the e-media was delivered; and
   verifying utilizing by the receiving party.

22. The method of claim 19 wherein the step of validating, by the receiving party, that the e-media has been received includes one of:
   sending, by the receiving party, a biometric signature; and
   entering a user's Unique IDentifier by the receiving party to indicate that the e-media has been utilized.

23. In a digital content delivery system, a method for performing an unattended validation of delivery of printed e-media, comprising the steps of:
   packaging, by the sender, the e-media;
   specifying, by the sender, a level of feedback from the receiving party that includes determining if the e-media and attached documents sent with it were printed and if the receiving party opened and interacted with the e-media and attached documents;
   receiving, by the delivery service, the e-media delivery request;

accessing, by the delivery service, the sender account to obtain pertinent information;

transmitting, by the delivery service, the e-media to the receiving party, wherein the client is a software application;

automatically delivering of the e-media to a printer of the receiving party;

creating a history record that includes a chain of delivery events occurring after sending the e-media and interaction events occurring after receipt of the e-media; and validating, in the form of a biometric signature, by the receiving party, that the e-media has been received and sending the history record and regular status updates on availability times of the receiving party to receive new e-media based on the events of the history record to both the sender and the receiving party, wherein the validation of the requested type of delivery is unattended by the receiving party.

24. The method of claim 23 wherein the step of transmitting, by the delivery service, the e-media to the receiving party includes at least one of:

informing the delivery service that the e-media was transmitted; and determining a desired level of delivery validation.

25. The method of claim 23 wherein the step of delivering the e-media to the printer of the receiving party includes at least one of:

informing the delivery service that the e-media was delivered; and verifying receipt by the receiving party.

26. The method of claim 23 wherein the step of validating, by the printer of the receiving party, that the e-media has been received includes one of:

automatically sending, by the printer of the receiving party, a biometric signature; and automatically entering a user's Unique IDentifier by the printer of the receiving party to indicate that the e-media has been received.

27. In a digital content delivery system, a method for performing an unattended validation of delivery of e-media, comprising the steps of:

packaging, by the sender, the e-media;

specifying, by the sender, a level of feedback from the receiving party that includes determining if the e-media and attached documents sent with it were printed and if the receiving party opened and interacted with the e-media and attached documents;

requesting, by the sender, the delivery service to deliver the e-media;

accessing, by the delivery service, the sender account to obtain pertinent information;

transmitting, by the delivery service, the e-media to a receiving party;

delivering of the e-media to a consumption device of the receiving party;

creating a history record that includes a chain of delivery events occurring after sending the e-media and interaction events occurring after receipt of the e-media;

validating, in the form of a biometric signature, by the consumption device of the receiving party, correct delivery of the e-media and sending the history record and regular status updates on availability times of the receiving party to receive new e-media based on the events of the history record to both the sender and the receiving party, wherein the validation of the requested type of delivery is unattended by the receiving party; and sending to the sender the history record and regular status updates on availability times of the receiving party to receive new e-media based on the events of the history record.

28. The method of claim 27 wherein the pertinent information includes at least one of:

a user's Unique Identifier;

identification of the e-media; and a desired level of delivery validation feedback.

29. The method of claim 27 wherein the step of validating, by the consumption device of the receiving party, the correct delivery of the e-media includes validating a user's Unique Identifier.

30. In a digital content delivery system, a method for performing an unattended validation of delivery of e-media, comprising the steps of:

packaging, by the sender, the e-media;

specifying, by the sender, a level of feedback from the receiving party that includes determining if the e-media and attached documents sent with it were printed and if the receiving party opened and interacted with the e-media and attached documents;

requesting, by the sender, the delivery service to deliver the e-media;

accessing, by the delivery service, the sender account to obtain pertinent information;

transmitting, by the delivery service, the e-media to the receiving party;

delivering of the e-media to a consumption device of the receiving party;

creating a history record that includes a chain of delivery events occurring after sending the e-media and interaction events occurring after receipt of the e-media;

validating, in the form of a biometric signature, by the consumption device of the receiving party, correct delivery of the e-media, wherein the validation of the requested type of delivery is unattended by the receiving party; and receiving the history record, regular status updates on availability times of the receiving party to receive new e-media based on the events of the history record and a validation of the requested type of delivery upon receipt of the e-media by the receiving party to allow the receiving party to make future e-media delivery decisions.

31. The method of claim 30 wherein the pertinent information includes at least one of:

a user's Unique Identifier;

identification of the e-media; and a desired level of delivery validation feedback.

32. The method of claim 30 wherein the step of validating, by the consumption device of the receiving party, the correct delivery of the e-media includes validating a user's Unique Identifier.

* * * * *

UNITED STATES PATENT AND TRADEMARK OFFICE
CERTIFICATE OF CORRECTION

PATENT NO. : 7,058,685 B1  
APPLICATION NO. : 09/694542  
DATED : June 6, 2006  
INVENTOR(S) : Pieter J. van Zee et al.

Page 1 of 1

It is certified that error appears in the above-identified patent and that said Letters Patent is hereby corrected as shown below:

In column 1, line 51, delete "consumer receiving" and insert -- consumer/receiving --, therefor.

In column 9, line 38, delete "known" and insert -- know --, therefor.

In column 11, line 61, in Claim 14, insert -- audit -- before "information".

In column 12, line 11, in Claim 19, after "delivery" delete "service".

In column 12, line 33, in Claim 19, delete "regulator" and insert -- regular --, therefor.

In column 12, line 50, in Claim 21, delete "utilizing" and insert -- utilization --, therefor.

Signed and Sealed this

Seventeenth Day of March, 2009

JOHN DOLL  
*Acting Director of the United States Patent and Trademark Office*